Aug. 20, 1929.          G. C. SNYDER                1,725,378
                          VEHICLE
                   Filed Oct. 26, 1925      3 Sheets-Sheet 1
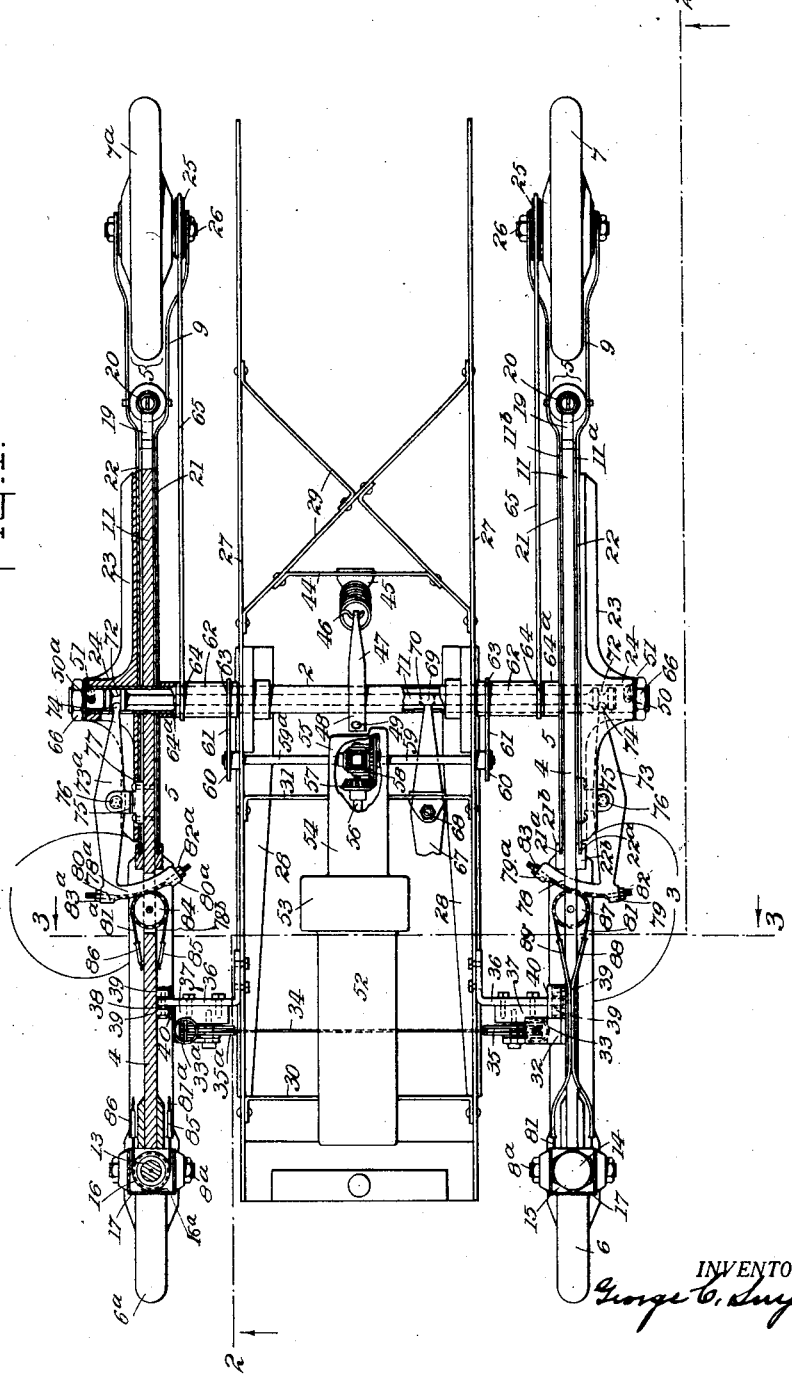
INVENTOR.
George C. Snyder

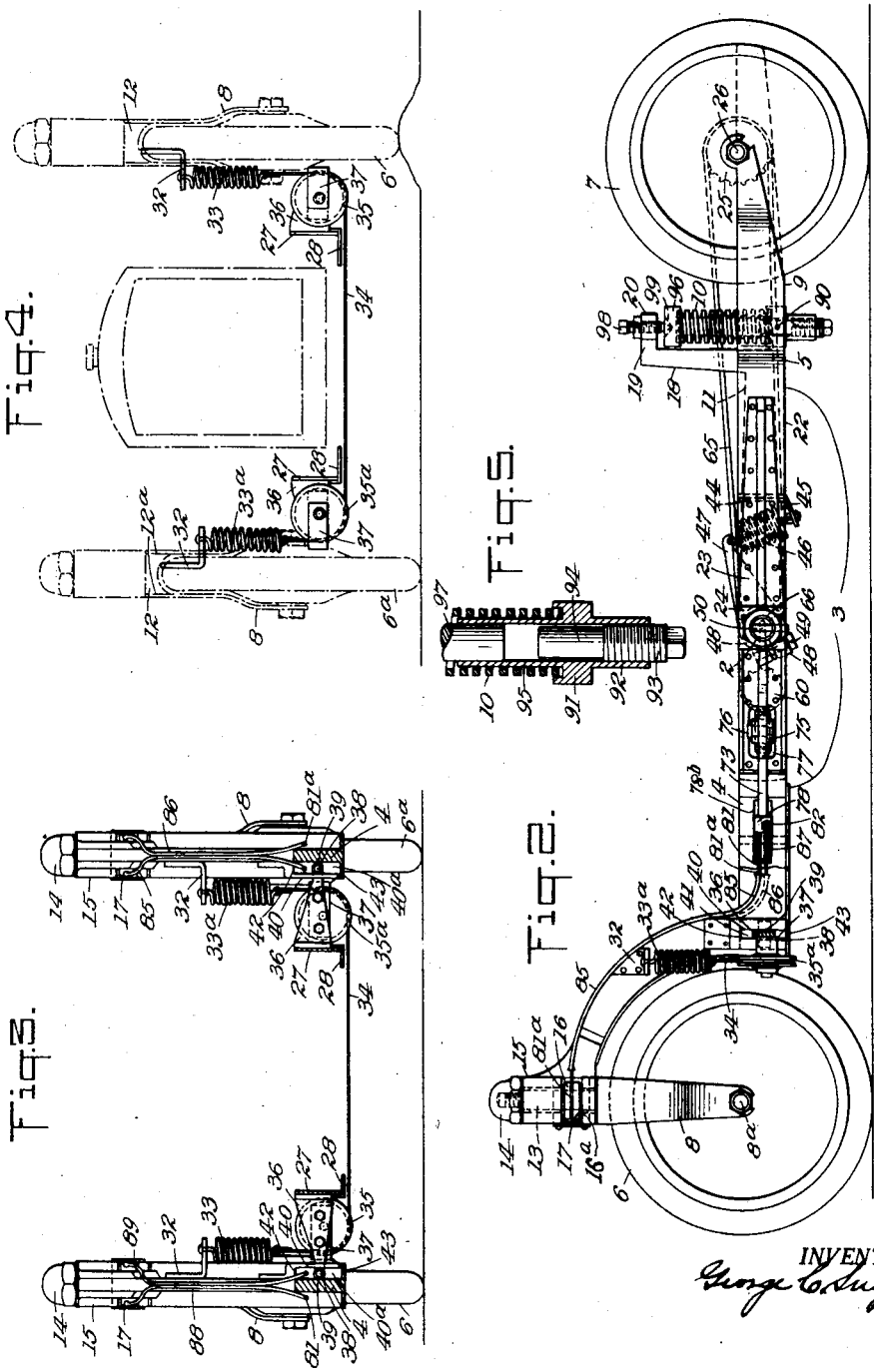

Aug. 20, 1929.　　G. C. SNYDER　　1,725,378
VEHICLE
Filed Oct. 26, 1925　　3 Sheets-Sheet 3
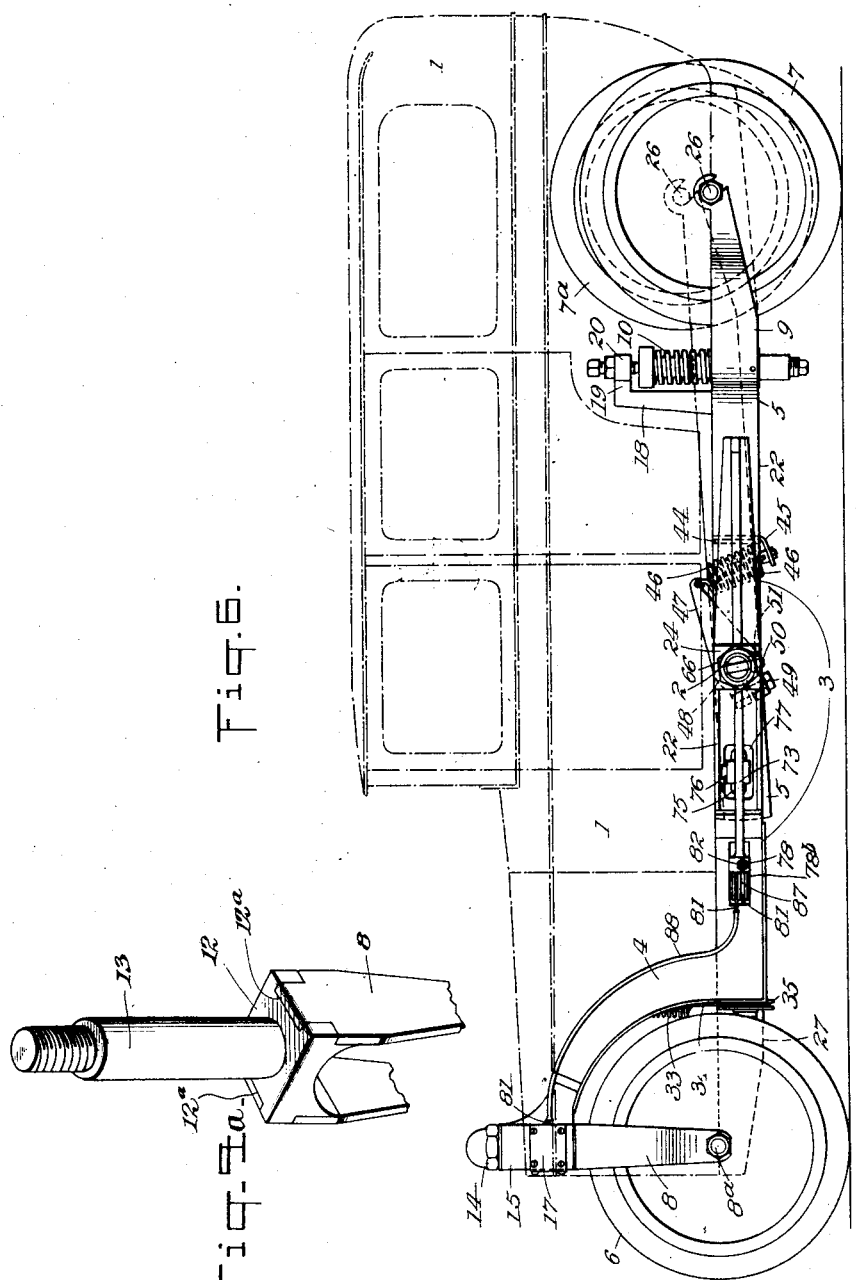
INVENTOR
George C. Snyder Patented Aug. 20, 1929.

1,725,378

UNITED STATES PATENT OFFICE.

GEORGE C. SNYDER, OF NEW YORK, N. Y.

VEHICLE.

Application filed October 26, 1925. Serial No. 65,012.

The present invention relates to vehicles in general, but more particularly to vehicles propelled by forces other than the muscular power or weight of a rider. In certain respects this application includes novel principles disclosed in my co-pending application Serial No. 47,061, filed July 30th, 1925, in that the said application discloses a shaft supported by longitudinal side-members which are oscillatable transversely of the shaft, such shaft being located between the propulsion-initiating means and a propeller wheel, but being in that application utilized directly in the propulsion of the vehicle.

Novel features and principles not disclosed in the said co-pending application are disclosed in the following description of preferred embodiments:

The wheels of the improved vehicle are mounted in forks carried by four side-pieces which are pivoted, and oscillate, preferably on a horizontal transverse shaft located midway between the front and rear pairs of wheels. Each front side-piece is so mounted on said shaft that it, together with a rear side-piece, constitute a resilient side-member, the resiliency being due preferably to a helical spring mounted on the member where it is adapted to resiliently carry the car body and load supported on the transverse shaft. The front and rear pieces of each such member are joined in the vicinity of the shaft, preferably by a hinge-like connection wherein the shaft represents the pin of the hinge. One of the side-pieces is extended sufficiently beyond the shaft to provide an extension which is spaced from the other side-piece to receive a spring, cushion, or the like, which is mounted preferably as shown in the drawings, so that when a road obstruction jolts one or both of the wheels which support the side-member, the spring is compressed, little or no jolt or movement being carried to the body of the car through the transverse shaft.

The entire weight of the vehicle, apart from the wheels and side-members, is supported on the shaft through the medium of a platform or frame. One end of the platform is supported by resilient members carried by the two adjacent side-pieces. These members operate in conjunction with a third resilient member which is connected with the other two side-pieces through the medium of the transverse shaft. These three resilient members in combination function as stabilizers which maintain the platform and its load "floating" on an "even keel" in relation to the road, as they absorb the road jolts imparted to the wheels in such manner as to practically eliminate the longitudianl rocking now common to automobiles. Furthermore, as the frame and body are supported through the transverse shaft on and betwen resilient side-members instead of directly over springs, the result is that the transverse rocking also common to prevailing types of automobiles is likewise eliminated so thoroughly that the weight of three or four men on one side running-board causes only a barely perceptible depression of the body. No one of these desirable conditions is present in the prevailing type of automobile.

The ease of riding and safety thus obtained are further enhanced through the fact that the above-described system of suspension admits of a much lower floor level, and thus a lower center of gravity, while using road wheels of unusually large diameter. The new principles allow a return to large road wheels, even such diameters as were formerly used in the finer carriages, for the obvious reason that large wheels roll more easily than small ones over obstructions.

The use of larger diameter road wheels, together with the resiliency of the above-described suspension, gives a much greater degree of riding comfort than ever before known, not only without using balloon tires, but even without using pneumatic tires at all, solid rubber tires being entirely adequate.

The common automobile is also subject to objectionable side-sway, for two principal reasons: (a) The high center of gravity or top-heaviness causes undue sway above the floor-line, just as the sway in the crow's nest of a ship is many times more noticeable than on deck. (b) The second reason, which is productive of constant and irritating sway and vibration in ordinary cars, is that the frame, with its engine and body, passengers and cargo, are entirely supported on long leaf springs and shackles, which are inherently unable to prevent side motion of these great weights in relation to the axles on which the springs are mounted. No practicable means has been found for preventing this side-flexing and twisting movement of such springs and their shackle-connections.

These two faults (a) and (b) combine to limit the present type of automobile to a primitive degree of riding comfort.

The improved vehicle avoids fault (a) through having a much lower center of gravity than is possible where an axle is used between the rear wheels as a means of propelling such wheels, as is now common practice, because in such cases the differential, axles and housing must be on a straight line with the centers of the wheels, and on the housing near each wheel the springs are mounted which support the frame with the engine, body and load. This axle arrangement prevents any really low-slung body, because this housing, with its bulb-like center, must be free to move up and down over rough roads without striking against the frame. As this freedom of movement must be great, the bottom of the frame must be slung comparatively high above the axle. Incidental to such positioning of these heavily housed mechanisms is the wear and tear they get through road shocks. This is avoided in the improved vehicle, which has no axle at all between wheels and which therefore permits lowering the body to any desired points.

As to the fault (b) which is inherent in the common type of automobile, the improved vehicle eliminates this trouble completely in a simple and economical fashion. The body is supported approximately midway of its length on a transverse shaft which is fixed to the side-members in such manner that no movement of the body to or away from such members is possible.

As to the suspension springs in the improved vehicle, they are preferably all helical in character, which means low cost and long life, and the manner of their mounting permits of no side-sway whatever. Moreover, twisting strains, which are a common cause of broken springs, are impossible with the helical springs. The improved spring suspension is preferably limited to comparatively light and simple helical springs, for example of phosphor bronze, cheaply and simply wound into proper form, easily assembled and not subject to breakage, because these springs are mounted so that they cannot be compressed or expanded except along direct axial lines. (For better illustration, the springs are shown not housed in the drawings hereinafter referred to.) These springs therefore cannot be twisted or deformed. Furthermore, they cannot be broken in use, because means are provided to prevent their flexing beyond a point far within their elastic limit. The prevailing type of automobile, however, is not adapted to the use of the helical springs as the principal suspension.

Obviously, in connection with this improved spring arrangement, the oil requirement is practically nil.

The front steering wheels are adapted to be steered by the driver through a hand steering wheel of the ordinary design manipulated in the regular manner, and as any common type of motor may be used in conjunction with ordinary controls for clutch, brakes and gear-shift, any driver familiar with cars now in regular use has nothing new to learn in order to properly drive the improved vehicle.

While the hand steering wheel is of the common type, the combination of means employed for connecting that wheel with the front road wheels to steer the latter is entirely new. Like other steering systems, this new system is designated to automatically cause the inside front wheel to turn on a properly lesser radius than the outside front wheel does, when the vehicle is rounding a curve. However, this new steering system is scientifically correct in its theory and mechanically accurate in its operation, as will be explained in detail later, while the steering system now in vogue is admittedly neither.

The improved vehicle needs no universal joints, regardless of whether chain or shaft drive is used. Furthermore, in the improved vehicle the differential is mounted rigidly in close conjunction with the transmission, clutch and engine, all on one platform, so that the differential is constantly in a fixed relation with these vital parts of the power system, instead of being slung in the ordinary manner between the two rear wheels, where, with its heavy metal housing, it is subjected to constant abuse through road shocks. In the new vehicle, there being no axle between wheels, each rear wheel is driven by its own independent, light but positive drive, in such manner that none of the driving parts can bump the frame or body, no matter how rough the roads.

In the improved vehicle the differential is mounted in a "zone of safety" where there are no stresses tending to throw its gears out of proper mesh with each other.

While the improved vehicle involves many principles which are new, there is one outstanding characteristic which alone makes possible all the advantages hereinbefore mentioned and many others herinafter to be described, namely, the axis or axial line of the main transverse shaft which connects the two side-members. Any mechanical movement which is initiated through a part mounted in fixed relation with the platform supported on said shaft, and which movement is linked up with any part not mounted in such relation, for the purpose of moving the latter part, must utilize the axis of the shaft as an intermediary channel between the initiation of the movement and its completion. This is the case in connection with both propulsion and steering of the vehicle. It is obvious that the utilization of this axis as such intermediary makes at once attainable a high degree of accuracy and a low degree of friction. These advantages are not found in any other type of vehicles having a spring-suspended body, because no other provides a totally neutral point or line, such as this axis. Broadly, this axial line serves in connection with the improved vehicle as a veritable clearing house or central office through which to pass mechanical movements, and in the performance of this function it automatically renders those movements scientifically correct.

The vital importance of the axis of the transverse shaft will be understood where it serves as an intermediary of the power transmission system as illustrated, and with such constant accuracy as to make any standard type of silent chain drive practical in this connection. It will be seen that the propeller wheels when travelling must assume constantly varying relations with the engine, because while these wheels bob up and down the engine maintains a comparatively stable position. These conditions are like those which exist when the engine is mounted in the manner common to automobiles. However, in such autotmobiles power is transmitted from the engine to the rear wheels by a central longitudinal drive-shaft with universal joints, through a differential distantly removed from the source of energy and hung where subjected to shocks and strains.

In the improved vehicle, on the other hand, the differential is mounted close to the transmission, and the engine, gear case and differential housing may be all solidly bolted together, or may be cast as a unit. Stubbed lateral shafts extending from the differential are used as transmission shafts carrying sprockets or gears which are connected to other sprockets or gears which revolve on the main transverse shaft, around the axial line (clearing-house). With a chain drive such connections may be made through minor chains, and with a shaft drive (not shown here, but which I will cover by a patent application now in preparation for filing), through intermediate gears. In the chain drive the sprockets on the main shaft are of course connected by the major chains with the sprockets on the rear hubs. In such shaft drive, on the other hand, the gears on the main shaft in turn actuate independent straight and solid drive-shafts, each of which drives a rear wheel through a terminal pinion which, through a gear mounted on the rear wheel hub, drives said wheel in a positive way, all these mentioned gears being mounted with ball and roller bearings within properly designed housings. The axle of each rear wheel, being in any case a mere stub, is relatively small and light, and is removably keyed to the wheel, which is positioned within a fork, this fork being, in the case of the shaft drive, vertical and pivoted at the head. At no time are such axles subjected to any strain tending to distort them or their bearings, and they are not subjected to undue bending stresses, as the weight of the car is carried through the forks to axle bearings close to both sides of each wheel, while in the case of the shaft drive the inward extensions of the axles carry no weight other than the housings containing the light pinions and shaft tails.

By virtue of the presence of a neutral transverse axis in the improved vehicle the steering of the vehicle is perfected through mechanical movements transmitted and governed with precision, so that when the vehicle is travelling in a straight line the steering road wheels are in parallel directional planes, and when the direction of travel of the vehicle is not straight, then the extended axial lines of all the road wheels of the vehicle always intersect a common vertical line, the vertical line forming the momentary axis of rotation.

In steering the improved vehicle there is initiated through the hand steering wheel, in the ordinary manner, a movement which, after passing through a worm or the like, is transmitted through a lever acting on a rod axially housed within the tubular main transverse shaft. This linkage is adapted to move the axial rod laterally of the vehicle, in one direction or the other, in answer to the turning of the hand steering wheel to the right or left. The extremities of the rod are near the ends of the transverse shaft, and are provided with slots annular to the rod, the general direction of the slots being inclined with respect to the axis of the rod. The opposite walls of each slot are equidistant from each other, which relationship serves to positively and correctly guide a member in each slot, the members being snugly confined within the slots. Each member is the terminal of a pivotally supported lever, the opposite end of which has cable connections adapted to steer a road wheel, so that when the slotted transverse rod is moved along its axial line a coefficient movement of the road steering wheel occurs. Obviously, if the slots in the rod had straight line faces at right angles to the rod's axis, the road steering wheels would each be turned to the same degree as the other. If, again, these slots had straight line faces inclined with respect to the rod's axis, the inclination of the angle of such faces might be plotted to result in a positive steering of the vehicle with a degree of accuracy similar to that of the ordinary trapeze arrangement of steering linkage above. However it will be observed from the drawings referred to later on that in the improved vehicle the slots in the axial rod, while being inclined with respect to the rod's axis, do not have such straight line faces, but instead each slot is curved, the curvature, in practice, being accurately calculated and shaped to provide for scientifically correct steering without slippage or road friction, through properly differentiating the positions of the road steering wheels with respect to each other at all times, whether the vehicle is on a straight or curved course.

To sum up the advantages in the new vehicle: These are of two main classes, economy and comfort. From the standpoint of economy, the elimination of universal joints results in the great saving in power above referred to, with a further saving through the lighter construction of the car itself. The elimination of leaf springs results in a large saving both in first cost and upkeep. Again, the unique suspension obviates the necessity of pneumatic tires, making possible a greater degree of riding comfort than before known, while using an inexpensive type of tire. To some the chief appeal of the improved vehicle will be its unequalled riding qualities, and to others, its economy; but from the above description its general superiority is clear.

The above being among the objects and advantages of the present invention, the same consists of certain features of construction and combinations of parts to be hereinafter described in connection with a preferred embodiment of the invention and then claimed, in which drawings:

Fig. 1 is a top plan view of the vehicle, a portion thereof at the right being shown in longitudinal section;

Fig. 2 is a side elevation of the chassis on line 2—2, Fig. 1, the engine, etc., being omitted;

Fig. 3 is a transverse section as viewed from the rear, on the line 3—3, Fig. 1;

Fig. 4 is a front elevation, parts being an broken lines and parts in full lines, showing a front wheel as having struck an obstruction in the roadway;

Fig. 4$^a$ is a perspective view of the front fork, parts broken away;

Fig. 5 is an enlarged vertical sectional elevation illustrating a spring connection in the vehicle; and Fig. 6 is a side elevation of the vehicle, the body being shown in broken lines, and the rear right wheel being shown as having struck an obstruction.

It should be distinctly understood that so far as there are basic novel features disclosed herein which are in common with aforesaid application, Serial No. 47,061, filed July 30th, 1925, those features are reserved for the present application.

The objects and advantages of a preferred form of the invention have already been described herein in general, and such preferred form of the invention will now be described in detail.

The vehicle body 1 for carrying passengers, cargo, etc., is mounted on a platform to be described later on. The structure to be supported, such as body 1 or the like is carried by such platform, which in turn is oscillatably mounted on a preferably central transverse tubular shaft 2. On the end portions of tubular shaft 2 are mounted longitudinal side members 3, 3$^a$ as seen more clearly from the plan, Fig. 1.

Such side members may be of any suitable construction adapted for the intended purpose and each comprises a front side piece 4 and a rear side piece 5, so that there are two front side pieces 4 and two rear side pieces 5, which independently carry the front wheels 6, 6$^a$ and the rear wheels, 7, 7$^a$.

The front wheels are each supported by a fork 8 which extends preferably in a line vertically above the front wheel axle 8$^a$ which is firmly fixed in the lower end of the fork 8. The forks 9 for the rear wheels 7, 7$^a$ are shown as the rear portions of the rear side pieces 5 and they extend in substantially horizontal planes with the stub axles of the rear wheels. The respective front side pieces 4 and rear side pieces 5 may oscillate on the shaft 2 so that each of the front and rear wheels may independently oscillate. Inasmuch as this is a preferred construction, advantage of this principle of construction is made use of by a helical spring 10, one at each side of the vehicle. Preferably these springs are of helical formation for reasons heretofore given.

As seen more clearly from the plan, Fig. 1, each front side piece 4 is provided with a rearward extension 11, and these rear extensions are spaced from the respective portions (to be later described) of the rear side pieces 5 by means of spacer blocks 11$^a$, 11$^b$, which may be secured to the rear side pieces 5, so that the front side pieces 4 and the rear side pieces 5 may each have oscillation independent of the other side pieces with a minimum of friction upon each other and without interference.

Each of the forks of the front steering wheels, 6, 6$^a$ is provided with a head 12, each fork being secured to its corresponding head at 12$^a$ as by brazing or otherwise. Upwardly and centrally from each head 12 there extends a stem 13. The upper end of each stem 13 is screw-threaded to receive a cap-nut 14 which is screwed thereonto and when it is screwed home on the reduced screw-threaded portion of the stem and against the larger portion of the stem, the nut establishes such a snug yet loose relation between the head 15 and the stem 13 as to permit a free turning movement of the corresponding front steering wheel on the vertical axis established by the stem 13. One advantage gained by this construction is that it results in supporting the corersponding portion of the weight of the vehicle directly over the center of each front wheel axle $8^a$ and allows for steering such wheels with a minimum of friction at the stem 13, and without imposing strains upon the steering linkage, which are occasioned in the automobiles now prevailing on account of the steering knuckles being at the sides of the front wheels. The heads 15 beforementioned are at the forward ends of the upwardly extending portions of the front side pieces 4.

Keyed or otherwise secured to each forkstem 13, is a grooved steering pulley 16 preferably formed as a collar slipped onto and then secured to the stem, such pulley being located in an open portion or mouth on each head 15, to which there is secured a suitable housing 17 for enclosing the pulley. These housings exclude the dust and dirt from the moving parts within them.

Referring again to the rear extensions 11 of the front side pieces 4, each of said rear extensions is provided with an upwardly extending arm 18, from the upper end of which there extends rearwardly a lug 19 which is provided with a threaded eye 20, to be later on referred to. The rear side pieces 5 are each preferably composed of plates 21, 22 set on edge in vertical planes and the forward edges of these plates 21, 22 preferably extend into vertical slots $21^a$, $22^a$, formed in the rear sides of bearing blocks $21^b$, $22^b$ which are rigidly secured in suitable manner to the front side pieces 4. Preferably each plate 21, 22 is reinforced by a thicker reinforcing plate 23, rigidly riveted thereto and extending longitudinally with it. Each reinforcing plate 23 is provided with an outwardly extending boss 24, which bosses constitute the hubs for the rear side pieces 5.

Inasmuch as in the improved vehicle a propeller wheel sprocket and its corresponding sprocket (at the other end of the chain) are always maintained in the same plane, a chain drive is practicable under all conditions including the highest speeds. A chain drive is therefore preferable. Hence, sprocket wheels 25 are shown herein as fixed to the stub axles 26 of the rear wheels.

Referring more particularly to the plan, Fig. 1, the platform which supports the body, etc., comprises longitudinal side stringers 27 which may oscillate on the transverse shaft 2, and each stringer is provided with longitudinal stiffening members 28, preferably angular in cross-section so as to provide flanges which extend in substantially horizontal planes towards one another. These stiffening flanges or members 28 are shown so arranged as to reinforce the forward end of the platform. To the rear of the transverse shaft 2 the platform stringers 27 are connected by a truss 29. In advance of the shaft 2 the stringers 27 are shown as connected rigidly together by means of struts 30, 31. The skeleton construction of the platform may be carried out in any suitable or preferred manner but the skeleton construction shown is a preferred one.

The upwardly and forwardly extending portions of the front side pieces 4 are provided at their sides with rigidly mounted angular brackets 32. These brackets 32 constitute the supports for the upper ends of helical stabilizer springs 33, $33^a$ which are suspended downwardly therefrom and their lower ends are connected together through the medium of a flexible connecting line or cable 34. Line or cable 34 is guided on sheaves 35, $35^a$, one at each side of the platform comprising stringers 27, etc. Extending outwardly from the sides of the platform are brackets 36 rigidly secured thereto and upon the brackets there are rigidly fixed the blocks or supports 37 for the journal pins of the sheaves 35, $35^a$. Said sheaves 35, $35^a$ are thus preferably arranged so that they may turn more or less, and in the same vertical plane, which is a plane transverse of the vehicle. As shown more clearly in Figs. 1 and 3, the brackets 36 carry cross pins 38 rigidly mounted therein at their outer ends and upon these pins anti-friction guide rollers 39 are journaled. To the adjacent sides of the front side pieces 4 bearing plates 40 are rigidly fixed so as to provide between the adjacent inner surfaces of said side pieces 4 and the bearing plates 40 vertical guide ways $40^a$ in which the rollers 39 may play with an up and down motion.

The bearing plates 40 are provided with vertical slots 41 so that the outer ends of the brackets 36 may freely pass through said bearing plates. From the construction just described it will be observed that the brackets 36 and the rollers 39 may have an up and down motion which is preferably limited by means of the positive stops 42, 43, respectively at the upper and lower ends of the guide ways. The described helical springs 33, $33^a$ and their connections, including the sheaves 35, $35^a$ and cable 34, function in the following manner:

When a road obstruction elevates a wheel, and if a cable were positively connected at each end to the brackets 36 without the presence of any springs such as 33, $33^a$ at all, the effect would be to raise the corresponding end of the platform exactly one-half of the extent of the movement of the said road wheel thus reducing the possible movement of the platform by fifty per cent. However, since the springs 33, $33^a$ are present, and the inert weight of the body is imposed on the platform, the cooperative effect of these springs is such as to absorb the remaining fifty per cent of movement and to practically eliminate any movement of the body. Furthermore another cooperating stabilizer in the form of a helical spring is always automatically acting to make sure that the body maintains an even keel, and more will now be said of this third stabilizer.

As shown more clearly in Fig. 1, a rigid strut or cross-piece 44 is secured to the truss 29 and it is provided with a bracket 45 to which one end of the third helical spring 46 is secured. The opposite end of helical stabilizer spring 46 is secured to an arm 47 which is provided with a split collar 48 which is clamped rigidly to the tubular transverse shaft 2 by means of bolt 49. By such means the spring 46 is rendered adjustable. Accessory cooperative features with this stabilizer spring 46 comprise pins 50, 50ª which preferably have a drive fit in the ends of the tubular shaft 2, and the projecting ends of these pins may play in transverse slots 51 in the hubs 24 of the side pieces 23. In the drawings these slots are shown as at the bottom of the hubs.

The function of these pins 50 and slots 51 in connection with the propeller wheels 7, 7ª is simple but important. When a road obstruction elevates a rear wheel, as for example, wheel 7ª, Fig. 6, the effect is an oscillation of the main transverse shaft 2 through the medium of the pin 50ª on the corresponding side of the vehicle, which pin bears against the end of the slot and thereby slightly oscillates the said shaft 2. Said shaft, through the arm 47, in turn puts tension upon the third stabilizer spring 46, while at the same time the pin 50 on the other side of the vehicle plays freely in its slot without imparting any movement to the adjacent rear side piece 5. Incident to these described simultaneous movements of parts, the first described pair of stabilizer springs 33, 33ª, through the medium of the platform, resist the expansion imparted to the third stabilizer spring 46 in such manner as to neutralize all these combined movements, with the result that the jolt of the rear wheel 7ª does not impart any noticeable movement whatever to the body of the vehicle or in any way change its constant even keel. The same even keel condition holds true at all times, as when both rear wheels simultaneously encounter a road obstruction, or when both front wheels do likewise, the cooperative stabilizing effect described absorbing all jolts common to roads. The body or the supported structure is kept constantly "floating" on an "even keel".

Referring to Fig. 1, the engine 52 is diagrammatically illustrated. The housing 53 of the clutch and fly-wheel and the transmission housing 54 follow the engine 52, in the usual manner of arrangement of those housings and the operative parts contained therein, and these operative parts, including the engine, may be of any desired type, as they constitute no part of the present invention. However, the housings 53 and 54 may be formed integrally with each other, as also with a housing 55, which latter under the present invention preferably constitutes the differential housing.

Under the present invention, the differential is preferably located in the forward portion of the platform 27, etc., just behind the drive shaft 56 from the transmission, which shaft has the bevel pinion 57 thereon. One of the differential gears 58 is of course in mesh with the driving pinion 57, and extending laterally from the differential assembly are differential shafts 59, 59ª which are shown as mounted to rotate in the stringers 27 of the platform. The differential shafts 59, 59ª are provided at their outer ends with sprocket wheels 60 which are connected by minor sprocket chains 61 with sprocket wheels 63, which are fixed on sleeves 62. These sleeves 62 are mounted to rotate on the transverse shaft 2, one at each side of the platform 27, etc., and additional sprocket wheels 64 are also mounted to rotate with sleeves 62. In order that the sleeves with the sprocket wheels thereon may be properly spaced away from the side members for a correct drive of the rear wheels, spacing collars 64ª are arranged on the shaft 2 between the rear side pieces 5 and the outer ends of the sleeves 62. Major drive chains 65 are trained upon the sprocket wheels 64 and connect them with the sprocket wheels 25 mounted rigidly on the hubs of the rear wheels. It is clear that the axes of the sprockets 63, 64 at either side of the platform 27, etc., are co-incident with the longitudinal axis of the tubular transverse shaft 2.

The outer ends of the tubular shaft 2 are screw-threaded for the purpose of receiving cap-nuts 66, the function of which is to retain the side members, 3, 3ª upon the shaft.

Under the present invention the steering wheel and its shaft, together with motion-transmitting worm-gear may be of the commonly employed type, and the turning of the steering wheel in one or the other direction will cause the desired corresponding movement of a steering lever 67, which is pivotally supported at 68 upon the strut 31. The lever 67 has a circular terminal 69 which extends through an aperture in the transverse shaft 2 and into a slot 70 in the steering rod or member 71. Steering rod or member 71 may be shifted longitudinally in the tubular transverse shaft 2. It will be observed that the axis of the steering rod or member 71 is co-incident with the longitudinal axis of the tubular shaft. Levers, 73, 73ª are provided which have circular terminals 74 which extend through apertures in the outer ends of the tubular shaft and into annular grooves 72 in the outer end portions of the coupling rod or member 71. The terminals 74 of the levers 73, 73ª are preferably fitted so closely in the grooves 72 that when one side of a terminal bears against one wall of its groove, the opposite side of said terminal barely escapes frictional contact with the adjacent wall of said groove, so that steering force applied through the described connections and linkage will result in practically no lost motion whatever. It will be observed that the manner of connecting the hereinafter described steering cables is likewise devoid of lost motion common to the linkage systems now prevailing for steering automobiles.

At either side of the vehicle are disposed brackets 75 which are rigidly fixed to the front side pieces 4 in advance of the transverse shaft 2 and projecting through apertures 77 in the plates 22, 23. These brackets carry pivots 76 for the aforementioned levers 73, 73$^a$. The disposition of the levers 73, 73$^a$ and concomitant parts is such that the levers may oscillate each in a horizontal plane and they extend forwardly away from the tubular shaft.

The forward ends of the levers 73, 73$^a$ are provided with anchorage arms 78, 78$^a$, preferably of arcuate form, extending inwardly through openings 78$^b$ in the front side pieces 4. Anchorage arm 78 is provided with end lugs 79, 79$^a$, while arm 78$^a$ is provided with end lugs 80, 80$^a$; these lugs of these two arms serving to receive the ends of steering cables 81, 81$^a$ or other suitable connections. The steering cable 81 is at the left side of the vehicle and cable 81$^a$ at the right side, the cable or the like 81 being secured to the anchorage arm 78 by passing the ends of the same through the lugs 79, 79$^a$. The projecting ends of the cable are solidified in well-known manner to permit of threading, and nuts 82, 83 are secured onto said threaded ends. In a similar manner the cable or other connection 81$^a$ is secured by nuts 82$^a$, 83$^a$ to the lever arm 78$^a$.

Mounted in the openings 78$^b$ in the front side pieces for a rotatory movement are double grooved pulleys 84, 87; the same preferably turning in a horizontal plane. Cables 81, 81$^a$ or equivalent connections are respectively guided through guide-tubes 88, 89 fixed to the left-hand front side piece 4 and guide tubes 85, 86 fixed to the right-hand front side piece 4, and their approximate mid-lengths are trained around steering pulleys 16. One end portion of the cable 81 is guided in one of the grooves of the pulley 87 and passes in one direction away from the pulley and is anchored to one end of the arm 78 by nut 82, and the other end portion of the said cable is engaged in the other groove of pulley 87 and passes in the other direction, being anchored to the other end of said arm by the nut 83. The other cable 81$^a$ is similarly guided at its end portions by the two grooves of the pulley 84 and these end portions are similarly secured by the nuts 82$^a$, 83$^a$. It should be stated that the middle portions of the cable or the like, 81, 81$^a$ are positively secured to the grooved pulleys 16 by means of pressure plates 16$^a$ which are preferably held by screws to the rims of the pulleys, so as to cause a binding against said intermediate portions of the cables.

The grooves 72 extend into the coupling rod in a general direction away from the terminals of the rod. Through this formation of the grooves the steering of the front road wheels is so differentiated that when the vehicle is rounding a curve, the inside wheel turns on a lesser radius than the other. Furthermore, the side walls of the grooves, instead of being straight, are curved, and as hereinbefore stated, these curves are so plotted that the said differentiation in steering is scientifically correct and accurate at all times. This degree of accuracy is in contrast to the recognized "error" present in the trapeze form of steering linkage which is now in universal use. The said curvature of course varies more or less in accordance with the dimensions of the particular vehicle and of its steering parts, but such curvature is readily plotted with mathematical precision to suit any particular case.

Referring to Figs. 2 and 5, the preferred manner of mounting the main suspension spring 10 and connecting it with the front side pieces and the rear side pieces of the side members 3, 3$^a$ is illustrated. A pin 90 is mounted in suitable bearings of each of the rear forks 9 and carries a spring-seat block 91 having a downward tubular extension 92. A plug 93 is screwed into the tubular extension 92 and may be adjusted as desired through the medium of its wrench-head. Supported upon the upper end of the block 93, is a cushioning block 94 preferably of elastic material, such as rubber, or other resilient means composed of any suitable material. The spring-seat block 91 is furthermore provided with an upward tubular extension 95 so that the said extension and the downward extension 92 are in alignment. Each main suspension spring 10 has its convolutions properly spaced from the cylindrical tubular extension 95 which receives said spring. The upper convolution of each spring 10 is fitted into a cap 96 which is provided with a plunger 97 which is located within the upper convolutions of the spring 10. This cap 96 is centered upon the spring by means of an adjusting screw 98 which is threaded into the eye 20 of rear extension 11, and the operative end of said screw is tapered and its pointed extremity bears in the concavity 99 formed in the spring cap 96 in such way as to render the cap self-centering.

This arrangement of main suspension springs 10 and the parts complementary thereto, together compose means for the ready adjustment of compression to regulate the longitudinal relationship of the main parts of the side members 3, 3$^a$, and through the cushion or the like 94 and the limiting blocks 93 there is provided an adjustable means for terminating the flexing of the springs and the oscillation of the side pieces within any desired limit of movement; there being no equivalent for these adjustments in the spring suspensions now in common use.

As for the oscillation in the other direction of the front and rear pieces of each side member, with respect to each other, the lower edges of the apertures 77 in conjunction with the bases of the brackets 75 also serve as positive stops to limit the degree of such oscillation.

While the leaf spring suspensions now in common use involve extensive and expensive lubricating arrangements, in the case of the improved vehicle it will be seen that as all of the springs shown in this preferred embodiment are of helical form and so mounted as to preclude the contact of any part of any spring with any other part of the same spring, no oiling whatever is necessary because there are no friction contacts.

A vital characteristic of the improved vehicle lies in the fact that the longitudinal axis of the main transverse shaft 2 is at all times, regardless of the configuration of the road upon which the vehicle travels, co-incident with the axes of every rotating and every oscillating member or part mounted thereon.

Also it will be observed that while the distances between wheel axes $8^a$ and 26 and all fixed points of the supported structure, such as platform 27, body 1, etc., are subject to variation, the said axis of the main transverse shaft 2 serves as an axis in common for said wheel axes and such supported structure. The axis of this shaft 2 therefore constitutes a veritable "clearing house" through which mechanical movements are received and transmitted with scientific accuracy.

It will be apparent that due to the novelty of the improved vehicle as a whole, there are practically unlimited possibilities of variation in the forms, arrangements and number of parts which may be used to obtain more or less like functions and similar results, without departing in the least from the fundamental principles which are the bases of the inventions covered by the appended claims.

There is no "shimmy" and none is possible under the present invention for the following reasons:

In the first place no road wheel can be tilted without at the same time positively tilting every other road wheel, and likewise to the same degree and at the same time tilting the body and every other part of the machine, as all parts are so positively connected that lateral movement of any one part without moving all parts is impossible.

Under the present invention, there is no tilting of any wheel as it passes over road obstructions because the gyroscopic effect on the four wheels revolving in a plane at right angles to the road is to make the wheels rebel at being tilted into any different plane; this force plus the inertia of the weight of the entire machine, which must likewise be tilted if any wheel is tilted, is such a great resistance that the result is that the helical spring (on the side corresponding to the shock) naturally and entirely absorbs the shock, so that no tilting occurs—hence no "shimmy" and no sway. Moreover, this correct mechanical condition combined with such proper spring action eliminates the stresses, and undue friction on bearings, which occur in common automobiles with every road unevenness, because the tilting of wheels and axles is practically constant and the spring supported body is therefore always quivering in response to the unevenness of the road, however slight.

Under the present invention, the constant parallelism of the important rotating parts, and the proper connecting together of such parts in the manner described and claimed, makes it the equivalent, in all main respects, of an ordinary stationary machine assembly of extreme simplicity.

It is to be understood that in the claims referring to the distances between wheel axes and all fixed points of the supported structure, the words "all fixed points" mean all fixed points of the supported structure which structure includes the body 1, and the platform 27, etc., supporting it, as well as all rigid mountings supported on the platform and body. For example, the expression "fixed points" is not intended to include springs, cables and the like elastic parts, but does include the rigid mountings for such parts. Likewise, the moving parts of the motor are not directly included, but the rigid mountings, such as the cylinder block, are included.

What I claim as new is:—

1. A wheeled vehicle in which the distances between wheel-axes and all fixed points of the supported structure are subject to variation, means for mounting each wheel for independent vertical movement, and in which vehicle there is an intermediate axis in common for the wheels and supported structure, the distances from said axis in common to the wheel-axes and to such fixed points remaining substantially invariable.

2. In a wheeled vehicle in which the distances between wheel-axes and all fixed points of the supported structure are subject to variation, cushioning means interposed between such wheel-axes and supported structure, and in which vehicle there is an intermediate axis in common for the wheels and supported structure, the distances from said axis in common to the wheel-axes and to such fixed points remaining substantially invariable.

3. In a wheeled vehicle in which the distances between wheel-axes and all fixed points of the supported structure are subject to variation, means for mounting each wheel for independent vertical movement, and in which vehicle there is an intermediate axis in common for the wheels and supported structure, the distances from said axis in common to the wheels-axes and to such fixed points remaining substantially invariable, a gear having an axis coinciding with aforesaid axis, and with respect to which gear-axis said wheels are also independently movable.

4. In a wheeled vehicle in which the distances between wheel-axes and all fixed points of the supported structure are subject to variation, means for mounting each wheel for independent vertical movement, and in which vehicle there is an intermediate axis in common for the wheels and supported structure, the distances from said axis in common to the wheel-axes and to such fixed points remaining substantially invariable, a steering member remote from the steering wheels and having an axis coinciding with aforesaid axis.

5. In a wheeled vehicle in which the distances between wheel-axes and all fixed points of the supported structure are subject to variation, means for mounting each wheel for independent vertical movement, and in which vehicle there is an intermediate axis in common for the wheels and supported structure, the distances from said axis in common to the wheel-axes and to such fixed points remaining substantially invariable, a control member remote from the wheels and having an axis coinciding with aforesaid axis.

6. In a wheeled vehicle in which the distances between wheel-axes and all fixed points of the supported structure are subject to variation, means for mounting each wheel for independent vertical movement, and in which vehicle there is an intermediate axis in common for the wheels and supported structure, the distances from said axis in common to the wheel-axes and to such fixed points remaining substantially invariable, a longitudinally movable shaft having an axis coinciding with aforesaid axis.

7. In a wheeled vehicle in which the distances between wheel-axes and all fixed points of the supported structure are subject to variation, means for mounting each wheel for independent vertical movement, and in which vehicle there is an intermediate axis in common for the wheels and supported structure, the distances from said axis in common to the wheel-axes and to such fixed points remaining substantially invariable, a tubular enclosing shaft having an axis coinciding with aforesaid axis.

8. In a wheeled vehicle in which the distances between wheel-axes and all fixed points of the supported structure are subject to variation, means for mounting each wheel for independent vertical movement, and in which vehicle there is an intermediate axis in common for the wheels and supported structure, the distances from said axis in common to the wheel-axes and to such fixed points remaining substantially invariable, a transverse enclosing shaft having an axis coinciding with aforesaid axis.

9. In a wheeled vehicle in which the distances between wheel-axes and all fixed points of the supported structure are subject to variation, means for mounting each wheel for independent vertical movement, and in which vehicle there is an intermediate axis in common for the wheels and supported structure, the distances from said axis in common to the wheel-axes and to such fixed points remaining substantially invariable, a transverse enclosing support having an axis coinciding with aforesaid axis.

10. In a wheeled vehicle in which the distances between wheel-axes and all fixed points of the supported structure are subject to variation, means for mounting each wheel for independent vertical movement, and in which vehicle there is an intermediate axis in common for the wheels and supported structure, the distances from said axis in common to the wheel-axes and to such fixed points remaining substantially invariable, a housing enclosing a steering member, said housing having an axis coinciding with aforesaid axis.

11. In a wheeled vehicle in which the distances between wheel-axes and all fixed points of the supported structure are subject to variation, means for mounting each wheel for independent vertical movement, and in which vehicle there is an intermediate axis in common for the wheels and supported structure, the distances from said axis in common to the wheel-axes and to such fixed points remaining substantially invariable, a transverse housing enclosing a steering member, said housing having an axis coinciding with aforesaid axis.

12. In a wheeled vehicle having a supported structure and steering linkage, such vehicle having an intermediate axis in common for the wheels and supported structure, the distances from said axis in common to the wheel-axes and all fixed points of the supported structure remaining substantially invariable, and such linkage comprising a link having an axis coinciding with aforesaid axis.

13. In a wheeled vehicle having a supported structure and driving mechanism, such vehicle having an intermediate axis in common for the wheels and supported structure, the distances from said axis in common to the wheel-axes and all fixed points of the supported structure remaining substantially invariable, and a member of the driving mechanism having an axis coinciding with aforesaid axis.

14. In a wheeled vehicle having side-members, a supported structure and connected steering members, all with an axis in common, one of the steering members having an axis coinciding with aforesaid axis and that of other steering members.

15. In a wheeled vehicle, the combination of a support, a propeller wheel vertically movable independently of other wheels, a steering member, and a driving member, the support and wheel having an axis in common, and both of said members having an axis coinciding with aforesaid axis.

16. In a four-wheeled vehicle, steering mechanism comprising means for maintaining the steering road wheels in parallel directional planes when the vehicle is travelling in a straight course, and means for differentiating the positions of the steering road wheels when the vehicle is travelling in a curved course, whereby the extended axial lines of all the road wheels always intersect a common vertical line, such vertical line forming the momentary axis of rotation.

17. In a wheeled vehicle in which the distances between wheel-axes and all fixed points of the supported structure are subject to variation, means for mounting each wheel for independent vertical movement, and in which there is an intermediate axis in common for the wheels and supported structure, the distances from said axis in common to the wheel-axes and to such fixed points remaining substantially invariable, a gear and steering member having axes coinciding with each other and with aforesaid axis and with respect to which said wheels are also independently movable.

18. In a wheeled vehicle in which the distances between wheel-axes and all fixed points of the supported structure are subject to variation, means for mounting each wheel for independent vertical movement, and in which there is an intermediate axis in common for the wheels and supported structure, the distances from said axis in common to the wheel-axes and to such fixed points remaining substantially invariable, a gear and control member having axes coinciding with each other and with aforesaid axis and with respect to which said wheels are also independently movable.

19. In a wheeled vehicle in which the distances between wheel-axes and all fixed points of the supported structure are subject to variation, means for mounting each wheel for independent vertical movement, and in which there is an intermediate axis in common for the wheels and supported structure, the distances from said axis in common to the wheel-axes and to such fixed points remaining substantially invariable, a shaft, a gear and steering member having axes coinciding with each other and with aforesaid axis and with respect to which shaft, gear and steering member said wheels are also independently movable.

20. In a vehicle, a shaft transverse of the vehicle and free to oscillate with respect to the supported vehicle structure, and a gear turnable on said shaft.

21. In a vehicle, a shaft transverse of the vehicle and free to oscillate with respect to the supported vehicle structure, and a sprocket wheel turnable on said shaft.

22. In a vehicle, a shaft transverse of the vehicle and free to oscillate with respect to the supported vehicle structure, and a steering member having an axis in common with the axis of said shaft.

23. In a vehicle, a shaft transverse of the vehicle and free to oscillate with respect to the supported vehicle structure, and a control member having an axis in common with the axis of said shaft.

24. In a wheeled vehicle, a platform, a main transverse shaft supporting the platform, and springs, one of which is forward of and spaced from said shaft and another of which is rearward of and spaced from said shaft, both resiliently cooperating to maintain the frame in a floating manner on a relatively even keel.

25. In a wheeled vehicle, a platform, a main transverse shaft pivotally supporting the platform, and spring means for maintaining the platform resiliently in a floating manner on a relatively even keel.

26. In a wheeled vehicle, a platform, means for pivotally supporting the platform in a floating manner, and resilient stabilizing means for maintaining the platform on a relatively even keel.

27. In a wheeled vehicle, a platform, means for pivotally supporting the platform, and resilient means supplementing the support furnished by the supporting means, adapted conjointly with said supporting means to support the platform on a relatively even keel.

28. In a wheeled vehicle, supporting wheels vertically movable independently with respect to each other, in combination with a platform, and means for supporting the platform from said wheels to maintain it on an even keel, notwithstanding the said independency of movement of the wheels.

29. A vehicle having road wheels laterally spaced from each other, a supported body, means for mounting the body so as to be positively tilted when the wheel is tilted, and means for preventing the shock of road obstructions from causing such tilts.

30. In a vehicle having road wheels laterally spaced from each other and a supported body, the combination of a rigid lateral connection between said body and road wheels whereby the entire vehicle is tilted when a wheel is tilted, and resilient means for absorbing the shock of road obstructions.

31. In a spring-suspended vehicle having more than two road wheels, a frame, a body and means for causing a positive tilting of the entire vehicle when a road wheel is tilted.

32. A motor vehicle having a resiliently supported motor and four road wheels, means whereby the tilting of one road wheel causes a positive and corresponding tilting of the motor.

GEORGE C. SNYDER.